US012390822B2

(12) United States Patent
Heyne

(10) Patent No.: US 12,390,822 B2
(45) Date of Patent: Aug. 19, 2025

(54) CONTAINER WITH CAP AND DISPENSING DEVICE

(71) Applicant: Achim Heyne, Aachen (DE)

(72) Inventor: Achim Heyne, Aachen (DE)

( * ) Notice: Subject to any disclaimer, the term of this patent is extended or adjusted under 35 U.S.C. 154(b) by 278 days.

(21) Appl. No.: 18/274,850

(22) PCT Filed: Nov. 5, 2021

(86) PCT No.: PCT/EP2021/080712
§ 371 (c)(1),
(2) Date: Jul. 28, 2023

(87) PCT Pub. No.: WO2022/161655
PCT Pub. Date: Aug. 4, 2022

(65) Prior Publication Data

US 2024/0116067 A1 Apr. 11, 2024

(30) Foreign Application Priority Data

Jan. 28, 2021 (DE) ..................... 10 2021 101 983.4
May 27, 2021 (DE) ..................... 10 2021 113 705.5
May 27, 2021 (EP) ..................................... 21176229

(51) Int. Cl.
*B05B 11/00* (2023.01)
*A45D 34/02* (2006.01)
*B65D 51/24* (2006.01)

(52) U.S. Cl.
CPC .......... *B05B 11/0005* (2013.01); *A45D 34/02* (2013.01); *B65D 51/249* (2013.01); *B65D 2501/0081* (2013.01)

(58) Field of Classification Search
CPC ..... B05B 11/0005; B65D 83/20; B65D 83/30; B65D 83/40; B65D 51/24; B65D 51/249; B65D 2501/0081; A45D 34/02
(Continued)

(56) References Cited

U.S. PATENT DOCUMENTS 3,233,788 A * 2/1966 Diamond ............... B65D 83/40 222/562
3,247,849 A * 4/1966 Wise ...................... A61M 11/02 604/184
(Continued)

FOREIGN PATENT DOCUMENTS

DE 3342513 A1 6/1985
DE 102015107928 A1 6/2016
KR 20210037500 A 4/2021

OTHER PUBLICATIONS

English Translation of International Preliminary Report on Patentability Search Report Dated Jul. 31, 2023, 6 Pages.
(Continued)

*Primary Examiner* — Charles P. Cheyney
(74) *Attorney, Agent, or Firm* — LUCAS & MERCANTI, LLP

(57) ABSTRACT

A cuboidal container for storing a liquid cosmetic substance includes a neck with an opening on an upper face of the container. A dispensing device is secured to the opening. The dispensing device is a pump connected to a dispensing head and a rising line guided in the interior of the container. A cap for the container has a cap upper face with a flat surface and a cap lower face with a first receptacle adapted for placement of the cap on the dispensing device. The cap lower face as a second receptacle designed as a three-sided pyramid designed to receive one of four corner regions on a lower face of the cuboidal container so that the container is held in the second receiving area in a form fitting and rotationally fixed manner in an aesthetically pleasing position when the cap is removed and resting on a flat surface.

10 Claims, 2 Drawing Sheets

(58) Field of Classification Search
USPC .......................................... 215/228; 222/182
See application file for complete search history.

(56) References Cited

U.S. PATENT DOCUMENTS

| | | | | | |
|---|---|---|---|---|---|
| 3,249,259 | A | * | 5/1966 | Corsette | B05B 11/1074 222/321.9 |
| 3,402,844 | A | | 9/1968 | Chin | |
| 3,515,307 | A | * | 6/1970 | Gach | B65D 83/40 220/915 |
| 3,841,533 | A | * | 10/1974 | Carroll | B65D 83/30 128/200.23 |
| 4,303,175 | A | * | 12/1981 | Lux | B65D 83/40 220/915 |
| 4,426,025 | A | * | 1/1984 | Knickerbocker | B65D 83/30 222/182 |
| 4,804,096 | A | | 2/1989 | Harding | |
| 5,384,096 | A | * | 1/1995 | Burns | A61B 5/150351 215/354 |
| 6,405,904 | B1 | * | 6/2002 | De Laforcade | B65D 83/56 222/321.9 |
| D840,245 | S | * | 2/2019 | Hennessy | D9/519 |
| 2012/0187151 | A1 | * | 7/2012 | DeJonge | B65D 83/20 222/153.13 |
| 2014/0061328 | A1 | * | 3/2014 | Haymond | B65D 43/02 239/6 |
| 2017/0369216 | A1 | | 12/2017 | Sezanayev | |
| 2018/0251276 | A1 | * | 9/2018 | Worden | B05C 11/10 |

OTHER PUBLICATIONS

International Search Report Dated Feb. 23, 2022, PCT/EP2021/080712, 2 Pages.

* cited by examiner

CONTAINER WITH CAP AND DISPENSING DEVICE

CROSS-REFERENCE TO RELATED APPLICATIONS

This application is a 371 of PCT/EP2021/080712, filed Nov. 5, 2021, which in turn claims the priority of DE 10 2021 101 983.4 filed Jan. 28, 2021, DE 10 2021 113 705.5 filed May 27, 2021, and EP 21176229.9 filed May 27, 2021. The priority of each of these applications is hereby claimed and these applications are incorporated herein by reference.

BACKGROUND OF THE INVENTION

The invention relates to a container for liquid substances comprising a neck having an opening on an upper side (3.1) of the container, a cap, wherein a flat surface is arranged on a cap upper side and a first receptacle is arranged on a cap lower side, a second receptacle arranged on the cap lower side which is adapted for positive receipt of a partial surface of the container so that when the cap has been removed and rests on the flat surface the container can be placed in the second receptacle, wherein the first receptacle passes through the second receptacle.

Such containers with caps for receiving liquid substances are known from the prior art.

U.S. Pat. No. 4,804,096 A discloses an ellipsoidal container for medicaments with a cap. The cap upper side has a flat surface. A first receptacle with an internal thread is arranged on the cap lower side, which can be screwed onto a screw thread on a neck of the container. The cap additionally has a second receptacle arranged on the lower side which is configured as a circumferential support surface with an inclined surface. The support surface is adapted to the curvature of the ellipsoidal container. The first receptacle having the screw thread of the container passes through the second receptacle with the inclined circumferential support surface. When the cap has been removed and rests on the flat surface, the container for medicaments can be placed in the second receptacle.

US 2017/0369216 A1 discloses a drinks container in the form of a pineapple whose cover has a first receptacle which can be screwed onto a neck of the container having a screw thread. Furthermore, the cover has an inner circumferential contour as second receptacle which substantially corresponds to the outer contour of a lower end portion of the container and can accommodate this when the cover is removed. The first receptacle is arranged on the base of the cover without penetrating the second receptacle.

U.S. Pat. No. 3,402,844 A discloses a cover which can be removed from the base of a ketchup bottle which, when the ketchup bottle is standing upright, receives a lower portion of the bottle with its lateral circumferential edge. The cover can be placed on the upper opening of the ketchup bottle with an inner wall running concentrically to the outer wall.

BRIEF SUMMARY OF THE INVENTION

Starting from U.S. Pat. No. 4,804,096 A as nearest prior art, the invention is based on the object of providing a container for storing liquid cosmetic substances, in particular perfume and eau de toilette whose cap, when removed, at the same time holds the container positively and at the same time in a twist-proof manner in a visually pleasing position as an aesthetically pleasing holder.

This object is solved by a container for liquid substances of the type mentioned initially whereby the container is a vial for storing a liquid cosmetic substance, the container is cuboid, wherein

- the container has six rectangular side surfaces which are at right angles to one another,
- respectively three of the six side surfaces converge on the lower side of the container in one of four rectangular corner regions, a dispensing device for the liquid cosmetic substance is fastened to the neck having an opening, which device has an outer part, the dispensing device has a pump whose pressure side is connected to a dispensing head and whose suction side is connected to a riser guided into the interior of the container, the first receptacle is adapted for placement of the cap on the outer part of the dispensing device and the second receptacle is configured as a three-sided pyramid open towards a base surface, wherein the three sides at the tip of the pyramid are at right angles to one another, adapted to positively receive one of the four rectangular corner regions of the container.

The cuboid container configured as a vial is adapted to receive liquid cosmetic substances such as body care products, products for tooth and mouth care, products for hair treatment, products for decorative applications as well as in particular products for influencing body odour. The term liquid substance here also comprises emulsions and suspensions as well as colloids with a liquid dispersion medium in which a liquid, a gas or solid are distributed as disperse phase. The vial is a specially shaped, in many cases also coloured container, in particular made of glass which is primarily suitable for visually pleasing and long-term storage of perfume or eau de toilette.

The cuboid container has six rectangular side surfaces which are at right angles, wherein in each case three of the six side surfaces on the lower side of the container converge in one of four rectangular corner regions. Four further rectangular corner regions are located on the upper side of the cuboid container.

The dispensing device fastened to the neck of the container comprises a pump, in particular a piston pump whose pressure side is connected to the dispensing head for the liquid cosmetic products, in particular a spray head and whose suction side is connected to the riser guided into the interior of the container. Pumps with a spray head are also designated as pump nebulizers. Such pumps are known per se from the prior art, for example, DE 33 42 513 A1.

In many cases, the aforesaid dispensing devices are configured as part of a screw closure with the aid of which the dispensing device is fastened to the neck of the container. Alternatively the dispensing devices can be fastened to the neck of the container by crimping. Crimping is understood in this case as a joining method in which two components can be joined together by plastic deformation.

The first receptacle for placement of the cap on the outer part of such a pump is preferably configured to be rotationally symmetrical, e.g. hollow-cylindrical. Depending on the type of fastening of the pump to the neck of the container, the hollow-cylindrical receptacle can have partial regions with different diameters in order to receive flush the spray head and the fastening means of the pump or a collar surrounding the fastening means. The first receptacle is adapted for placement of the cap on the outer part of the dispensing device; for this purpose, for example, it is usually placed on the outer part of the dispensing device and held by frictional locking.

The cap removed from the outer part of the dispensing device serves at the same time as an aesthetically pleasing holder for the cuboid container. The flat surface located on the cap upper side when the cap is placed thereon is placed on a surface, for example, of a shelf or table for use of the cap as a holder so that the cap lower side points upwards. By this means the second receptacle is released. The second receptacle is configured as a three-sided pyramid which is open towards a base surface wherein the three sides are at right angles to one another at the tip of the pyramid in order to receive one of the four rectangular corners regions of the container. The container is held positively and at the same time in a twist-proof manner in a visually pleasing position in this pyramidally shaped second receptacle. As a result of the twist-proof property, always the same position of the container to the cap serving as a holder is ensured.

The cuboid configuration of the container further contributes to the aesthetically pleasing appearance. Particularly preferably the container has a square cross-section, i.e. a square upper and lower side.

In an advantageous embodiment of the invention, the cap consists of an inner part comprising the first and second receptacle and an outer part receiving the inner part, wherein the inner and outer part consist of different material. Advantageously in terms of production technology, for example, the inner part can be mass-produced as an inexpensive injection-moulded part which is surrounded by an outer part consisting of a more expensive material.

In particular in containers for storing high-quality cosmetics, the value can be emphasized by a higher cap weight in which the inner part is connected via a plurality of webs to the outer part forming a cavity wherein the cavity is completely or partially filled with a material to weigh down the cap. In particular, metal is considered as weighing-down material. The weighing down of the cap at the same time increases the stability when this is used as a holder for the container.

In order to ensure a secure hold the cap placed on the outer part of the dispensing device, fastening means are arranged between the first receptacle and the outer part of the dispensing device. The fastening means make a detachable non-positive and/or positive connection between the cap placed thereon and the outer part of the dispensing device, for example, due to a frictionally engaged clamping connection and/or a tongue and groove connection. The groove is arranged, for example, on a screw closure of the pump or a collar whereas the at least one tongue engaging in the groove is arranged on an outer surface of the first receptacle in such a manner that when the cap is placed thereon, groove and tongue engage with one another. Furthermore, for example, a magnet connection comes into consideration for detachable fastening of the cap placed thereon on the outer part of the dispensing device.

The first receptacle is preferably configured to be rotationally symmetrical with respect to a first axis. The first axis runs in particular perpendicular to the rectangular plane on the upper side of the cap through its centre of gravity. The second receptacle configured as a three-sided pyramid has a second axis which runs through the tip and the base point of the base surface. In order to accommodate both the first receptacle for placement of the cap on the outer, cylindrical part of the dispensing device and also the second receptacle for positive receipt of one of the four base-side corner regions in the limited space of the cap, the first receptacle is designed as penetration of the second receptacle in the cap, wherein the first axis and the second axis run substantially parallel to one another. Substantially parallel to one another means that both axes have no point in common. This results in an eccentric arrangement of the second receptacle with respect to the centrically arranged first receptacle.

BRIEF DESCRIPTION OF THE DRAWINGS

The invention will be explained in detail hereinafter with reference to the figures. In the figures

DETAILED DESCRIPTION OF THE PREFERRED EMBODIMENTS

Figure 1A:
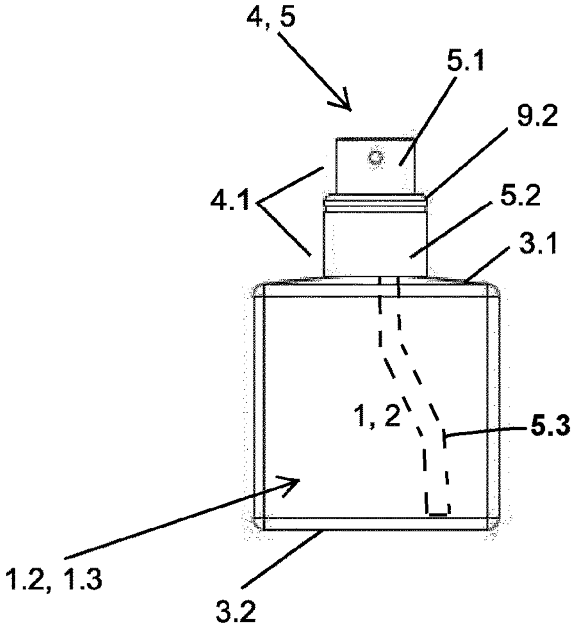
FIG. 1*a* shows a side view of a vial according to the invention with the cap removed.

FIG. 1*a* shows a cuboid container 1 which is configured as a vial 2 for storing perfume. The container 1 has six rectangular side surfaces 1.4 which are at right angles to one another (compare FIGS. 2*a*, 2*b*). In each case three of the six side surfaces 1.4 converge at the lower side 3.2 of the container in one of four rectangular corner regions 1.3.

An opening is located on a narrow neck on the upper side 3.1 of the container 1. A dispensing device 4 is fastened to the neck of the container 1, which dispensing device comprises a pump 5 whose pressure side is connected to a spray head 5.1 and whose suction side is connected to a riser 5.3, shown with dashed lines in the FIG. 1*a*, which is guided into the interior of the container 1. The pump 5 is fastened to the neck of the vial by means of crimping. The crimp connection is surrounded by a collar 5.2. The spray head 5.1 as well as the collar 5.2 together form the outer part 4.1 of the dispensing device 4.

Figure 1B:
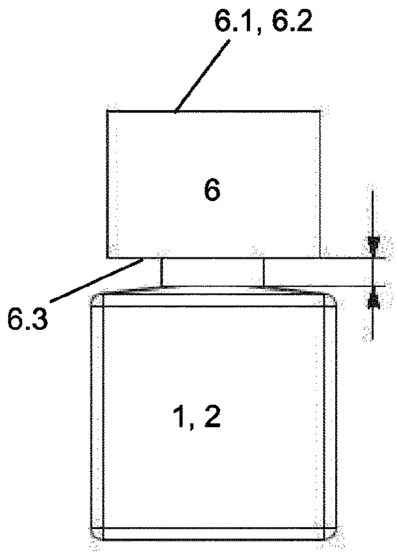
FIG. 1*b* shows the vial according to FIG. 1*a*) with the cap placed thereon.

FIG. 1*b* shows how a cap 6, in the present exemplary embodiment a cuboid cap 6 corresponding to the geometry of the vial, is placed on the outer part 4.1 of the dispensing device 4. On the cap upper side 6.1 the cap 6 is configured as a flat, rectangular surface 6.2.

Figure 2A:
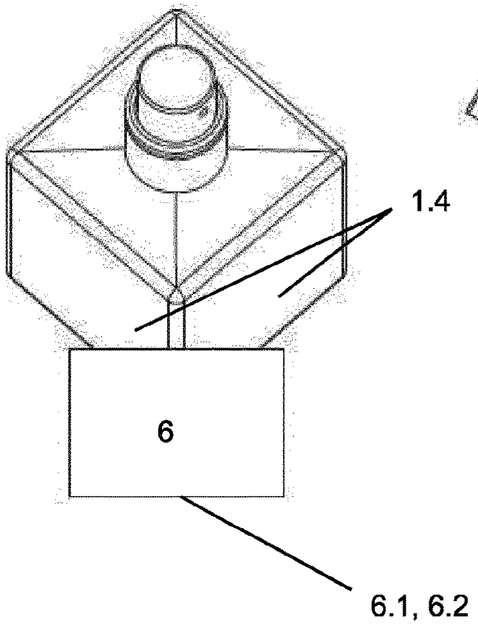
FIGS. 2*a*, 2*b* show different side views of the removed cap with vial placed therein.
Figure 2B:
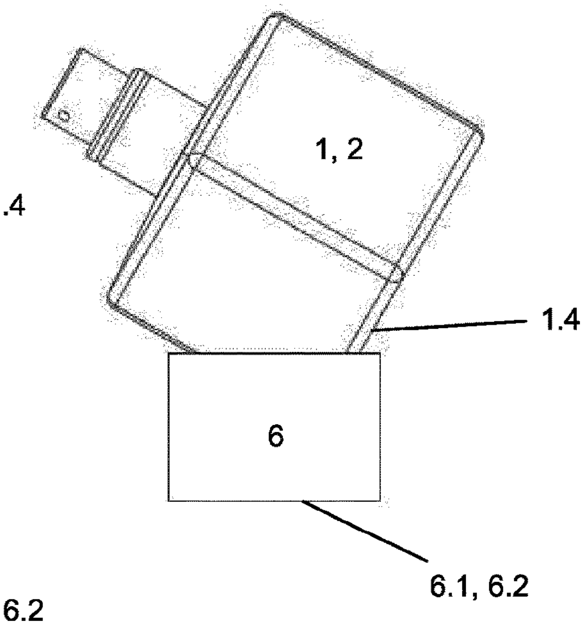
Figure 3A:
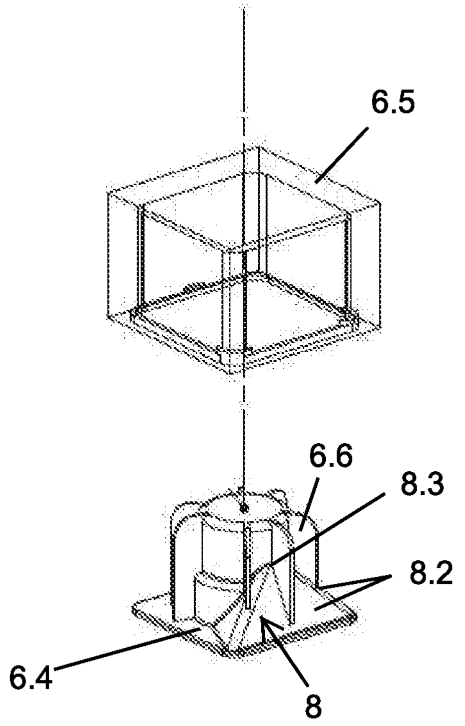
FIG. 3*a* shows an exploded view of a two-part cap viewed from the cap upper side.
Figure 3B:
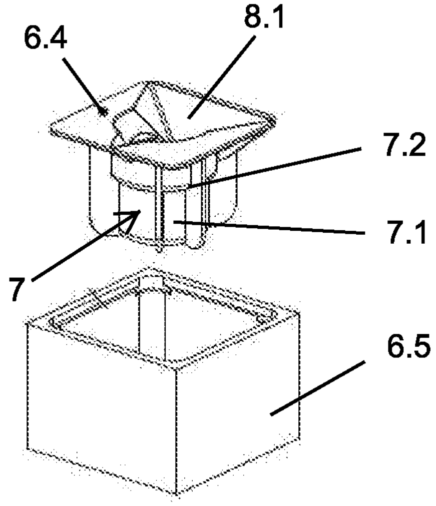
FIG. 3*b* shows the two-part cap according to FIG. 3*a*) viewed from the cap lower side and FIG. 3*c* shows a section through the two-part cap according to FIG. 3*a*) along the line E-E.

A first receptacle 7 is disposed on a cap lower side 6.3 which is adapted for placement of the cap 6 on the outer part 4.1 of the dispensing device 4 (compare FIG. 3*b*). A second receptacle 8 (compare FIG. 3*a*) is additionally arranged on the cap lower side 3 which is adapted to positively receive a partial surface 1.2 of the container 1, namely one of the four rectangular corner regions 1.3 so that when the cap 6 is removed and placed on the flat surface 6.2, the container 1 can be placed in the second receptacle 8, as shown in FIGS. 2*a*, 2*b*.

Figure 3C:
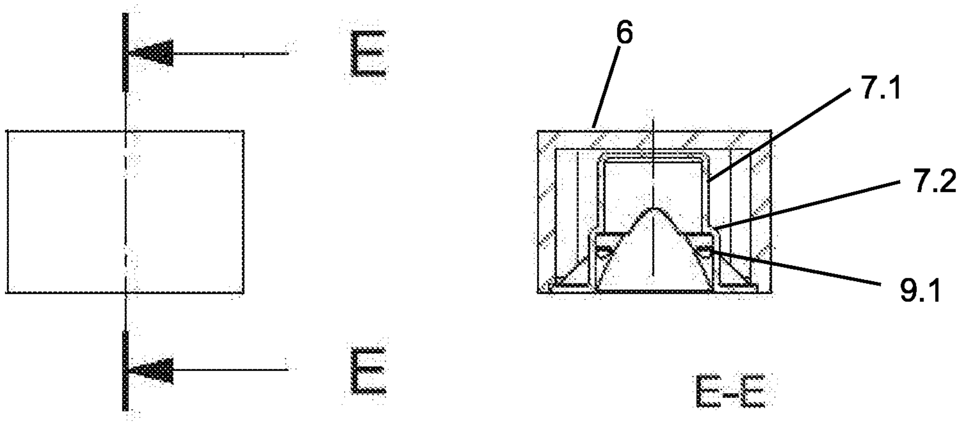

The structure of the two-part cap 6 shown in the exemplary embodiment will be explained hereinafter with reference to FIGS. 3*a*, 3*b*, 3*c*:

The cap 6 consists of an inner part 6.4 comprising the first and second receptacle 7, 8 and an outer part 6.5 receiving the inner part. In the example, the inner part 6.4 is an injection moulded part whereas the outer part 6.5 consists of a higher-quality material, for example, wood or imitation wood. The inner part 6.4 is inserted into the outer part 6.5 after manufacture by way of injection moulding and is firmly connected to this, for example, by adhesive bonding.

As can be seen in particular in the combined view of FIGS. 3*a* and 3*b*, the second receptacle 8 is configured as a three-sided pyramid which is open towards the base surface 8.1, wherein the three sides 8.2 are at right angles to one another at the tip 8.3 of the pyramid. The base surface 8.1 lies in the plane of the lower side 3.2 of the container 1. This second receptacle 8 cooperates with one of the four rectangular corner regions 1.3 on the lower side 3.2 of the container 1. One of the rectangular corner regions 1.3 of the container 1 is held positively and in a twist-proof manner in the position shown in FIGS. 2*a*, 2*b* in the second receptacle 8 of the cap 6.

The configuration of the first receptacle 7 for placement of the cap 6 on the outer part 4.1 of the dispensing device 4 can be further identified from FIGS. 3*a*, 3*b*. The first receptacle 7 is configured as a stepped hollow cylinder 7.1 with a contact shoulder 7.2 on which the upper side of the collar 5.2 comes to rest when the cap 6 is placed thereon. The smaller-diameter spray head 5.1 is received by the reduced-diameter part of the stepped hollow cylinder 7.1.

Detachable fastening means 9.1, 9.2, in the present exemplary embodiment in the form of a tongue and groove connection are disposed between the first receptacle 7 and the outer part 4.1 of the dispensing device 4. The tongues 9.1 can be seen in FIG. 3*c* and are arranged on the inner lateral surface of the stepped hollow cylinder 7.1 starting from the cap lower side 6.3 just below the contact shoulder 7.2.

When the cap 6 is placed thereon, the tongue 9.1 engages with the circumferential groove 9.2 on the upper edge of the collar 5.2 (cf. FIG. 1*a*) so that the cap 6 placed thereon maintains a distance of about 5 mm from the upper side 3.1 of the container 1 (cf. FIG. 1*b*).

It can be further seen from FIGS. 3*a*, 3*b* that the first receptacle 7 passes through the second receptacle 8 in the inner part 6.4 in a space-saving manner. Webs 6.6 extending outwards from the inner part 6.4 connect the inner part 6.4 to the outer part 6.5 forming a cavity which can be filled with metal, for example, to weigh down the cap 6 in order to underline the value of the two-part cap 6 by a higher weight despite the inner part 6.4 consisting of plastic. At the same time, the stability during usage of the cap 6 as a holder for the container 1 is increased.

The vial 2 is in particular suitable for storing perfume or eau de toilette; however, it can also be used for storing other liquid cosmetic substances.

REFERENCE LIST

| No. | Description |
|---|---|
| 1 | Container |
| 1.1 | Container interior |
| 1.2 | Partial surface |
| 1.3 | Rectangular corner region |
| 1.4 | Side surfaces |
| 2 | Vial |
| 3.1 | Upper side container |
| 3.2 | Lower side container |
| 4 | Dispensing device |
| 4.1 | Outer part |
| 5 | Pump |
| 5.1 | Dispensing head/spray head |
| 5.2 | Collar |

-continued

| No. | Description |
|---|---|
| 6 | Cap |
| 6.1 | Cap upper side |
| 6.2 | Flat surface |
| 6.3 | Cap lower side |
| 6.4 | Inner part |
| 6.5 | Outer part |
| 6.6 | Webs |
| 7 | First receptacle |
| 7.1 | Stepped hollow cylinder |
| 7.2 | Contact shoulder |
| 8 | Second receptacle |
| 8.1 | Base surface |
| 8.2 | Sides |
| 8.3 | Tip |
| 9 | Fastening means |
| 9.1 | Tongue |
| 9.2 | Groove |

The invention claimed is:

1. A container with a cap and a dispensing device for liquid substances, wherein the container is vial for storing a liquid cosmetic substance, the container is a cuboid having six rectangular side surfaces at right angles to one another, a lower side surface of the six rectangular side surfaces has four rectangular corner regions, at each of the four rectangular corner regions three side surfaces of the six rectangular side surfaces converge, and a neck having an opening on an upper side of the six rectangular side surfaces, the dispensing device is fastened to the neck, the dispensing device including a pump with a pressure side connected to a dispensing head and a suction side connected to a riser guided into an interior of the container, the cap includes a cap upper side and a cap lower side, the cap having a flat surface arranged on the cap upper side and a first receptacle having a first receptacle opening arranged on the cap lower side, the first receptacle is adapted to receive an outer part of the dispensing device for placement of the cap on the dispensing device of the container, the cap includes a second receptacle with a second receptacle opening arranged on the cap lower side, the second receptacle being adapted for positive receipt of a partial surface of the container, so that when the cap has been removed from the dispensing device, the flat surface of the cap upper side faces downward, and is supported by an underlying surface, the container can be placed in the second receptacle and supported by the cap, the second receptable being configured as a three-sided pyramid having three sides and is open toward a base surface, the three sides of the pyramid being at right angles to each other at a tip of the pyramid, the second receptacle being adapted to receive one of the four rectangular corner regions, and wherein the first receptacle passes through the second receptacle.

2. The container with the cap and the dispensing device according to claim 1, wherein the cap includes an inner part comprising the first receptacle and the second receptacle, and an outer part receiving the inner part, wherein the inner part is made of a first material and the outer part is made of a second material that is different from the first material.

3. The container with the cap and the dispensing device according to claim 2, wherein the inner part is connected via a plurality of webs to the outer part forming a cavity which is filled with a third material.

4. The container with the cap and the dispensing device according to claim 1, wherein fastening means are arranged between the first receptacle and the outer part of the dispensing device, the fastening means making a detachable non-positive and/or a detachable positive connection between the first receptacle and the outer part of the dispensing device.

5. The container with the cap and the dispensing device according to claim 1, wherein the first receptacle is rotationally symmetrical with respect to a first axis and the second receptacle configured as a three-sided pyramid has a second axis which runs through the tip and a base point of the base surface.

6. The container with the cap and the dispensing device according to claim 5, wherein that the first axis and the second axis run substantially parallel to one another.

7. The container with the cap and the dispensing device according to claim 1, wherein the base surface of the second receptacle lies in the plane of the lower side of the container when the container is received in the second receptacle.

8. The container with the cap and the dispensing device according to claim 1, wherein the cap is cuboid.

9. The container with the cap and the dispensing device according to claim 1, wherein the first receptacle and the second receptacle are arranged eccentrically with respect to each other.

10. The container with the cap and the dispensing device according to claim 6, wherein the first axis and the second axis are spaced from one another and have no point in common.

* * * * *